March 8, 1960

A. F. GRANT 2,927,472

TRANSMITTING MECHANISM

Filed June 29, 1956

INVENTOR.
Arthur F. Grant
BY
J. C. Thorpe
ATTORNEY

March 8, 1960 A. F. GRANT 2,927,472
TRANSMITTING MECHANISM
Filed June 29, 1956 3 Sheets-Sheet 2

INVENTOR.
Arthur F. Grant
BY
J. C. Thorpe
ATTORNEY

March 8, 1960
A. F. GRANT
2,927,472
TRANSMITTING MECHANISM
Filed June 29, 1956
3 Sheets-Sheet 3
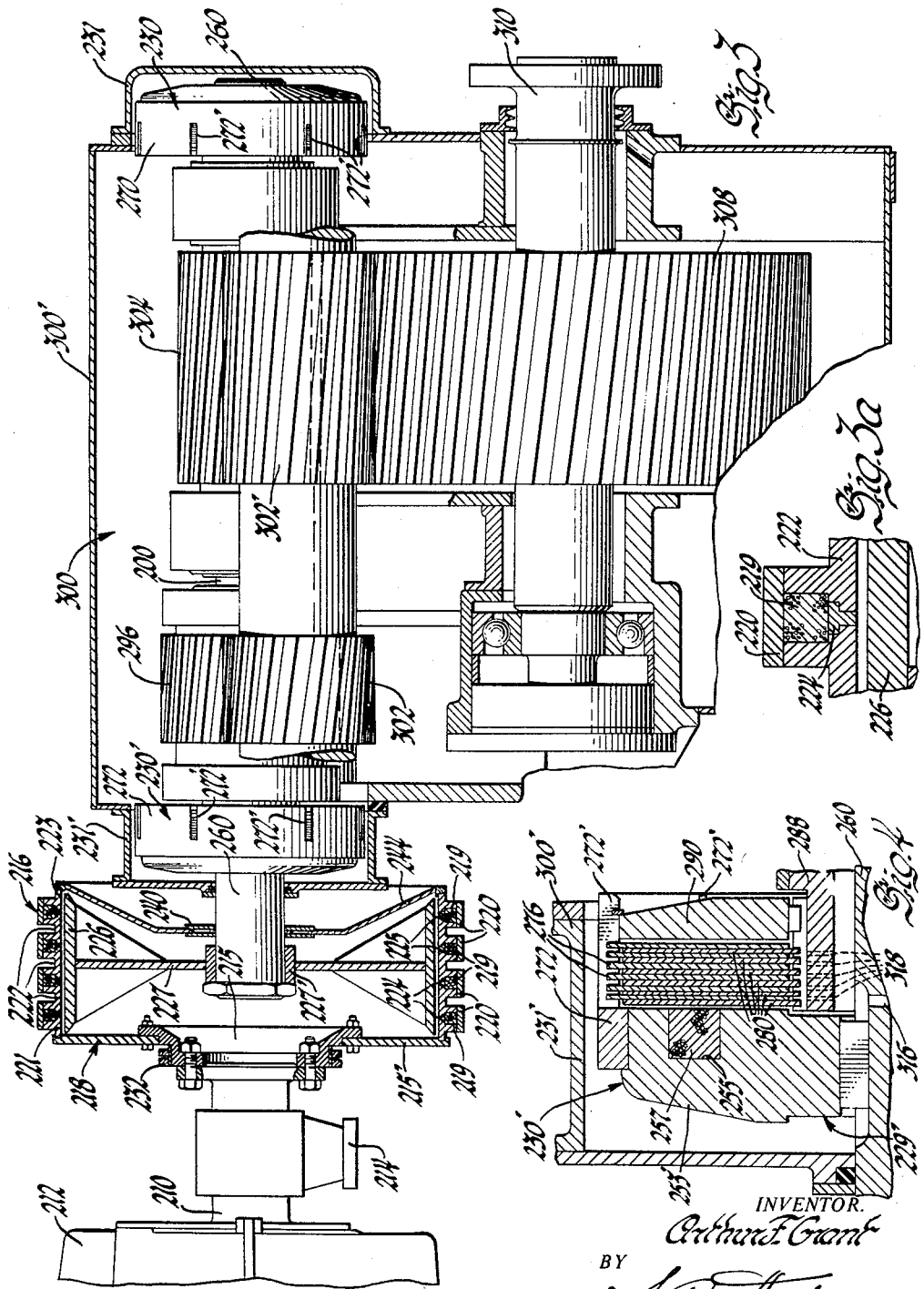
INVENTOR.
Arthur F Grant
BY
J.C. Thorpe
ATTORNEY

United States Patent Office 2,927,472
Patented Mar. 8, 1960

2,927,472

TRANSMITTING MECHANISM

Arthur F. Grant, Cleveland, Ohio, assignor to General Motors Corporation, Detroit, Mich., a corporation of Delaware Application June 29, 1956, Serial No. 594,869

18 Claims. (Cl. 74—378)

This invention relates to a power transmitting mechanism; more particularly, to a transmission having a plurality of alternative gear drive paths and including a plurality of controllable slip coupling means for selectively controlling the drive therethrough; and with regard to certain more specific aspects of the invention, to a reduction and reversing transmission particularly adapted for marine propulsion and maneuvering.

Among the principal objects of the invention are: to provide an improved power transmitting mechanism; to provide an improved power transmitting mechanism including a plurality of controllable slip drive control coupling mechanisms; to provide a power transmitting mechanism with remotely controlled drive control mechanism adapted to provide controlled slip between an input and output shaft; and to provide a power transmitting mechanism including a plurality of remotely controlled electro-magnetically actuated drive control coupling mechanisms adapted to provide controlled slippage between an input and output shaft and operative to smoothly effect a change in the drive paths through the transmission.

Also among the principal objects of the invention are: to provide an improved form of reversing and reduction transmission which is particularly adapted for marine use; to provide an improved reversing and reduction transmission particularly adapted for marine use with a unidirectional prime mover having a relatively small available speed range; to provide such an improved reversing and reduction transmission for marine use utilizing a plurality of remotely controlled electromagnetically actuated controllable slip drive control means so constructed and arranged as to facilitate maneuvering of the boat in which the gear is arranged; and to provide such an improved reversing and reduction transmission for marine use utilizing a magnetic particle coupling as a main drive control and at least two electromagnetically engaged controllable slip friction clutches to control reversing through said transmission.

A further and more specific object of the invention is to effectively use magnetic particle drive control means in a reversing transmission without the magnetic particle wear and sealing problems and the temperature control problems inherent in a reverse effecting magnetic particle coupling device such as shown and described in United States patent application Serial No. 443,775, filed July 16, 1954, in the name of Arthur F. Grant and entitled "Magnetic Particle Coupling."

Another object of the invention is to provide an improved reversing and reduction transmission for marine use utilizing a single magnetic particle coupling drive control to accommodate limited misalignment between the prime mover and the transmission gearing in accordance with the teaching of the aforementioned patent application and defining annular magnetic gaps in accordance with the teaching of the United States patent application Serial No. 593,965 filed June 26, 1956 in the names of William E. Brill and Arthur F. Grant and entitled "Magnetic Particle Coupling," thus eliminating the need for a flexible coupling intermediate the prime mover and the power transmitting mechanism.

It is also an object of the invention to provide such a reversing and reduction transmission for marine use with electromagnetically engaged friction clutches to control drive through the transmission, such clutches being of the type having substantially straight line slip-torque characteristics in accordance with the degree of electrical energization below a lockup operative condition.

A still more specific object of the invention is to provide such a reversing and reduction transmission for marine use utilizing two electromagnetically engaged multiple disk friction clutches for effecting changes in drive paths through the transmission gearing, such clutches being of the lubricated multiple disc type and having substantially straight line slip-torque characteristics in accordance with the degree of energization up to a lock-up condition of operation.

The foregoing and other objects, advantages and features of the invention will become apparent from the following description of several embodiments thereof having reference to the accompanying drawings, in which:

Figure 3 is a view similar to Figure 1 showing a modified form of the invention with Figure 3a being an enlargement of a portion thereof; and Figure 4 is a view similar to Figure 2 and showing the details of construction of one of the drive control units of Figure 3.

Figure 1:
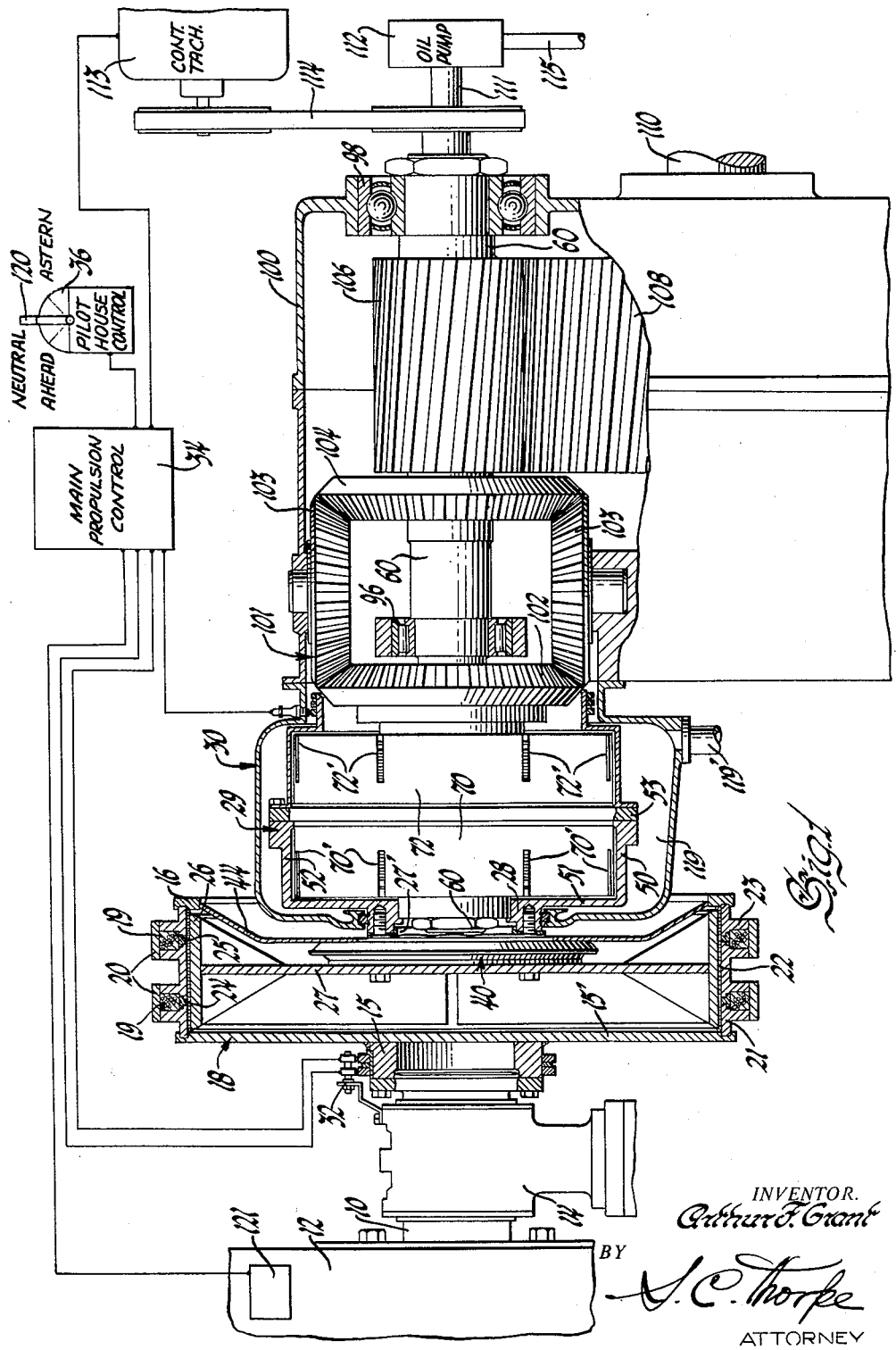
Figure 1 is a somewhat diagrammatic view of a power transmitting mechanism with portions thereof broken away and in section and showing one embodiment of the invention.
Figure 2:
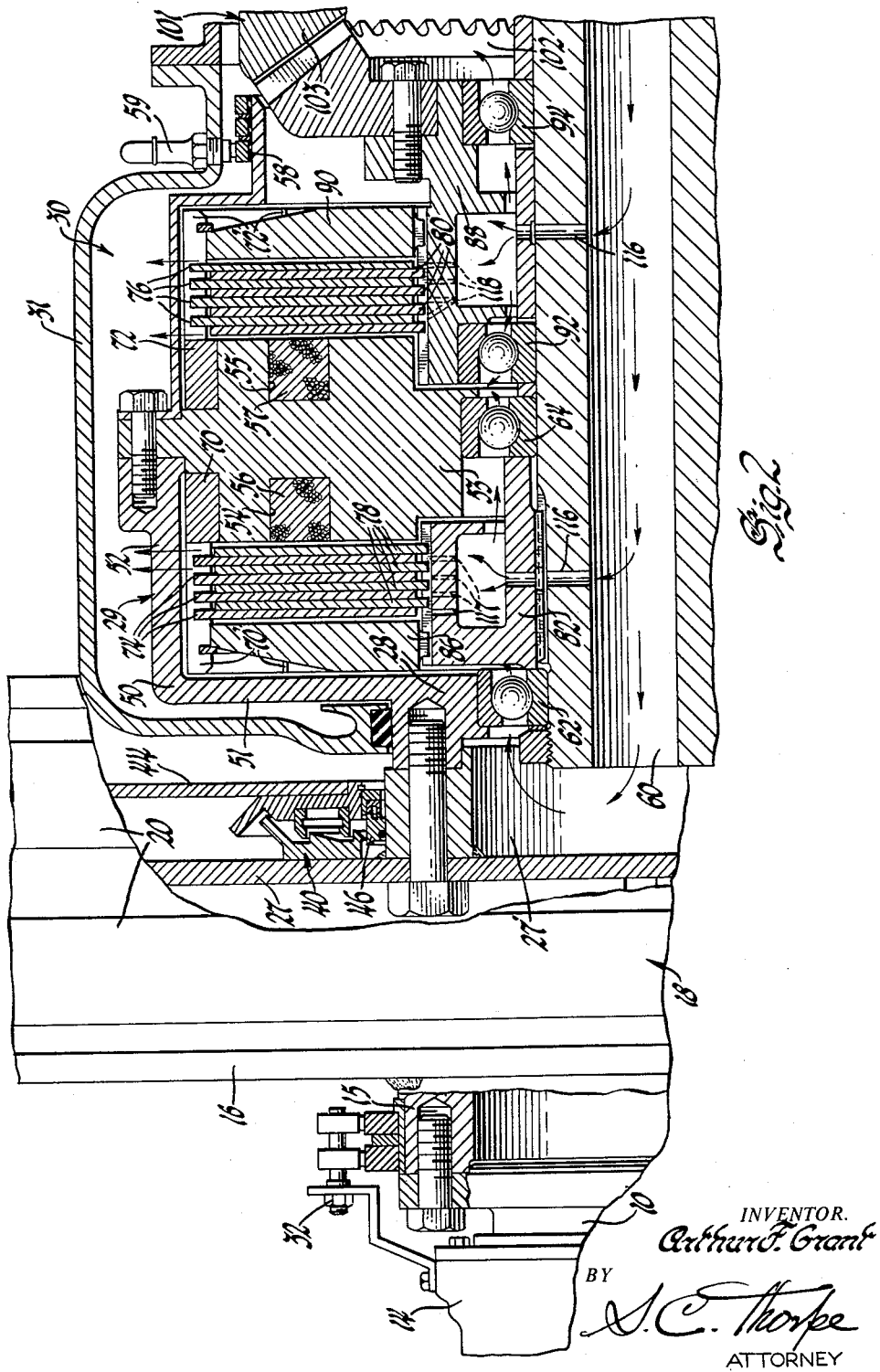
Figure 2 is an enlarged view of a portion of Figure 1 with portions theref broken away and in section to show certain details of the construction.

Referring more particularly to the embodiment of the invention illustrated in Figures 1 and 2, the end of a crankshaft 10 of an engine 12 is shown supported in a pedestal bearing 14 and is drivingly connected through a hub 15 and a plate 15' to an annular driving assembly 16 of a one-way magnetic particle coupling 18. The assembly 16 is provide with two annular electromagnetic field coil windings 19 which are mounted in pockets formed between axially-spaced annular magnetic members 21, 22 and 23 which are magnetically separated adjacent their inner peripheries by non-magnetic annular rings 24 and 25 and closed adjacent their outer peripheries by magnetic annular rings 20. The drum assembly 16 spacedly embraces a cylindrical inductor member 26 to form radial and axial magnetic gaps therebetween. The inductor member is secured by a web or spider 27 and a hub 27' to a hub 28 of a driving input assembly 29 of an electromagnetically actuated friction clutch unit of a reversing type which is designated generally by the numeral 30.

The field coil windings 19 of the magnetic particle coupling are connected through a ring and brush contact assembly indicated at 32 to a main propulsion control unit 34 and are progressively energizable by operation of a pilot house control unit 36 to establish a controllable load transmitting bond between the driving drum assembly 16 and the driven cylindrical member 26 through a magnetic particle mixture interposed therebetween. The torque-slip characteristics of this load transmitting bond varies in accordance with the degree of energization of the field coils 19 up to a point where the driving assembly 16 is effectively locked to the cylindrical member 26 by the bonding action of the magnetic particles. Preferably this occurs at a point corresponding to the minimum desirable engine operating speed; the pilot house and main propulsion controls being effective to control the speed of the driven member 26 between a no-speed condition and the minimum desirable speed of the engine by controlling the slippage through the magnetic particle coupling and being effective beyond such point to control the speed of the engine. The magnetic particle mixture is retained within the coupling 18 by a labyrinth type magnetic seal 40 interposed between the web 27 and a drum assembly carrying diaphragm 44 embracing the hub 27' and a magnetic face seal 46 interposed between the diaphragm carried elements of the magnetic labyrinth seal 40 and the hub 27'.

The driving assembly 29 of the electromagnetically actuated reversing friction clutch 30 comprises a driving member 50 formed integrally of the hub 28 and including a driving web portion 51 and an outer cylindrical portion 52 extending axially from the web portion. An annular electromagnetic pole member 53 is secured to the end face of the driving member 50 opposite the web portion 51. Two oppositely disposed annular pockets 54 and 55 are formed in and open axially of the pole member. Two electromagnetic field coil windings 56 and 57 are mounted in the pockets 54 and 55, respectively, and are connected through suitable slip rings 58 and brushes 59, which are carried by the driving assembly 29 and a casing 31 for the clutch 30, respectively, to the main propulsion and pilot house controls 34 and 36 which are adapted to selectively energize the windings 56 and 58. Such energization of either winding establishes the annular end faces of the pole member 53 flanking the energized coil as poles of opposite polarity and, as described in greater detail below, establishes a drive path through the transmission gearing. It will be noted that the hub portion 28 and the pole member of the driving assembly 29 are journaled relative to a hollow drive shaft 60 by two axially-spaced bearings 62 and 64.

Two annular members 70 and 72 are carried by the pole member 53 and constitute the driving input members of the ahead and astern clutch units respectively. Each of the members 70 and 72 has a plurality of slots 70' and 72', respectively, extending in opposite axial directions and engaging driving lugs on a plurality of friction plates 74 and 76, respectively, which are preferably of magnetic material and are sandwiched between a plurality of friction plates 78 and 80, respectively. The plates 78 and 80 are also preferably of magnetic material with the exception of the plates adjacent the pole faces of the pole piece. By making these two plates of non-magnetic material, these clutches are provided with a substantially straight line controllable slip characteristic inversely proportional to the degree of energization of their respective field windings 56 and 57. The plates 78 are inwardly splined to an ahead drive hub member 82 which is in turn splined to the hollow drive shaft 60 intermediate the bearings 62 and 64. A clutch keeper plate or actuator member 86 of magnetic material is also drivingly splined to the hub member 82 and is slidably mounted intermediate the ahead driving member 70 and the ahead drive hub 82. Energization of the field coil winding 56 causes the magnetic keeper 86 and the friction plates 74 and 78 to be actuated into engagement and thereby drive the ahead drive hub 82. The friction plates 80 and a keeper plate 90 of magnetic material are similarly splined to an astern drive hub member 88. The keeper 90 and the plates 76 and 80 are actuated by energization of the field coil winding 57 into driving engagement and thereby drive the astern hub member 88 which is journaled on the shaft 60 by two axially-spaced bearings 92 and 94.

The end of the shaft 60 embraced by and mounting the several elements of the reversing clutch 30 is cantilevered from suitable bearings 96 and 98 which journal the opposite end of the shaft in a reverse and reduction gear case designated generally by the numeral 100. The reverse and reduction gear comprises a reversing differential 101 including an input bevel gear 102 which is mounted on the astern hub member 88 and drivingly meshes with two idler bevel gears 103 journaled in the gear case 100 diametrically of the shaft 60. The gears 103 in turn drivingly engage an output gear 104 which is secured to the shaft 60. A pinion gear 106 is secured to the shaft 60 in axially spaced relation to the gear 104 of the reversing differential and meshes with a bull gear 108 which is secured to an output propeller-driving shaft 110 which is suitably journaled in the gear case 100. The drive ratio between the pinion and the bull gear is sufficient to effect a substantial reduction in the rotational speed of the output shaft relative to the speed of the shaft 60.

In the embodiment of Figure 1, the shaft 60 is extended as shown at 111 to drive an oil pump 112 and a control tachometer 113; the tachometer drive being through a suitable pulley and belt drive 114. The control tachometer 113 is preferably of a direct-current generator adapted to generate a signal, the magnitude and polarity of which are indicative of the rotational speed and direction of the shaft 60. This signal is imposed on the main propulsion control unit 34 and serves to coordinate the operation of the magnetic particle coupling and the ahead and astern units of the two-way friction coupling 30, as explained in greater detail below.

The inlet of the lubricating oil pump 111 is connected through a suitable conduit 115 to an oil sump, not shown. The oil pump discharges into the hollow shaft 60 and, as shown by the arrows in Figure 2, the lubricating oil flows axially of the shaft 60 and through a number of axially-spaced radial passages 116 to the operating parts of the reversing clutch 30 and to the reversing and reduction gearing within the gear case 100. The oil passing through the passages 116 into clutch unit 30 is forced through a plurality of fine holes 117 and 118 formed in the ahead and astern hubs 82 and 88, respectively, to cool and lubricate the mating friction faces of the plates 74, 78 and the keeper 86 and of the plates 76, 80 and the keeper 90. The portion of the lubricating oil passing through the clutch 30 drains into an oil sump 119 formed in the bottom of the clutch casing 31 and is returned to the main sump through a suitable conduit 119'.

As indicated above, the magnetic particle coupling 18 connects the prime mover with the clutch controlled reverse and reduction gear transmission mechanism and controls the output speed for the transmission between a zero speed condition and a speed corresponding to the minimum desirable engine operating speed and the reversing clutch mechanism is effective to control the direction of rotation obtained through the transmission from the unidirectional prime mover. This arrangement is particularly adaptable to a pilot house controller 36 having a single control lever 120 adapted upon movement from a neutral position N in one direction to control the rotation and speed of the output shaft in an ahead propulsion direction and adapted upon movement of the lever from neutral in the opposite direction to control the rotation and speed of the output shaft in an astern propulsion direction; the rotational speed of the output shaft corresponding to the degree of actuation of the control lever from its neutral position in either ahead or astern drive.

From the foregoing description it will be obvious that the embodiment of the invention of Figure 1 is adaptable to a number of different methods of operation depending upon the design of the pilot house and main propulsion controls 34 and 36, respectively, including the electrical interlocks necessary to control the sequential engagement and disengagement of the several drive controlling couplings in accordance with the speed of the engine and the speed and rotational direction of the output shaft. The preferred normal method of operation would be as follows. Assuming the engine to be operating at its normal idle speed with the control lever 120 in its neutral position, with actuation of the pilot house control lever in an ahead direction, the field coil winding 56 is energized first engaging the ahead clutch unit. This is followed by the energization of the magnetic particle coupling to establish a load transmitting bond through the magnetic particles in that coupling. The strength or torque transmitting characteristic of this bond is progressively increased as the control lever is advanced in the ahead direction with resultant decreasing slip and increasign output shaft speed until lock-up excitation of the field coil windings is achieved at an output shaft speed proportional to the governor controlled idle speed. Further actuation of the control lever 120 in the ahead direction maintains lock-up excitation on both the magnetic particle coupling and the ahead clutch unit and transmits a speed increasing signal through the main propulsion control 34 to an engine governor 121 which is operative to increase the fuel supplied to the engine and thereby the engine speed correspondingly up to a governor controlled maximum.

To effect a reversal of the drive through the transmission under normal operating conditions, the control lever 120 is moved towards its neutral position and the engine speed is reduced accordingly to the governed idle speed in accordance with the position of the control lever. This is followed by the progressive deenergization of the magnetic particle coupling field coil windings 19 with progressively increasing slip resulting in a reduction in the output shaft speed down to zero as the control lever reaches its neutral position. Further movement of the control lever into its astern sector results in the initial engagement of the astern clutch unit followed by the progressive energization of the magnetic particle coupling up to the lock-up excitation with further movement of the control lever serving to increase the governor-controlled speed of the engine.

If the control lever 120 is rapidly advanced in either its ahead or astern sectors from its neutral position, the corresponding reversing clutch unit is first engaged to establish the proper direction of drive and then the field coil windings of the magnetic particle coupling are energized according to the position of the control lever. The rate at which the magnetic particle coupling is energized may be controlled by the introduction of a suitable time delay factor in the main propulsion control. The need for such a factor is of course dependent on the speed range of the prime mover; and on the type of prime mover. It has been found that no such time delay factor is generally necessary with large, relatively slow speed marine Diesel engines; the engagement, torque limiting, and shock absorbing characteristics of such magnetic particle couplings being such as to result in a relatively soft, but rapid, build-up of the load imposed on the engine well within the load absorbing time characteristics of such engines.

In marine applications and certain other applications where the invention has particular utility, it is necessary to provide for high speed reversals for maneuvering or for high speed changes between drive ratios representing a substantial speed differential. The time factor involved in such changes in drive are generally critical; at least imperative. This is particularly true in marine applications to which the invention is particularly drected since such reversal in the propeller drive generally represents the only effective way of braking the momentum of the vessel. In smaller craft such as tugs, small cruisers, etc. such reversals are accomplished either by means of an electric drive entailing the use of a costly generator-motor set with complicated propulsion control equipment or by means of a clutched drive. Generally such clutch drives have been fluid actuated with relatively complex propulsion controls. In larger vessels the cost, size and design limitations relative to the propulsion torques involved have prevented the effective use of such drives; reversing generally being accomplished by reversing the engines, a time consuming process which requires relatively intricate and costly controls with either reversible or alternate engine accessories.

With the invention hereindescribed such reversals can be accomplished as fast or faster than with conventional electrical or clutched drives or with the magnetic particle reversing coupling shown and described in the aforementioned application, Serial No. 443,775. Such high speed reversing is accomplished with fine, accurate speed control and without the clutch and particle sealing wear, the heat dissipation, and the particle sealing problems inherent in the windage occurring in the deenergized unit of a reversing magnetic particle clutch. In such high speed reversing the single magnetic particle coupling is effective to provide a soft clutching action due to its inherent torque limiting and shock absorbing characteristics thus protecting the engine, the reversing clutch 30, and the reverse-and-reduction gear mechanism 100 from excessive torsional stressing. Due to the elimination of the particle windage of the deenergized clutch it has also been found possible with a slight increase in the particle charge to substantially increase the torque capacity of the single unit with substantially the same excitation and dimensional limitations.

As indicated above, such high speed reversing requires that the engagement and disengagement of the several clutches be coordinated in accordance with the engine and transmission output shaft speeds to prevent wear and shock loading of the clutches, the engine, and the transmission. Several methods may be used to effect such a high speed reversal of the drive through the power transmitting mechanism shown in Figure 1 as follows. Assuming the control lever 120 to be in its full ahead position, as the control lever is moved rapidly into its astern sector, the engine governor is effective to reduce the fuel supplied to the engine almost instantaneously. This reduces the engine speed and through proper interlocking of the main propulsion control 34, the speed of the engine is reduced substantially to idle before either the magnetic particle coupling or the ahead coupling is deenergized. Thus the inertia and compression loading of the engine is used to brake the inertia of the transmission propeller system.

With one method of operation, as the engine approaches its idle speed, the magnetic particle coupling is deenergized disconnecting the transmission from the engine. Simultaneously or immediately thereafter, the ahead clutch is deenergized and the astern clutch is energized. Energizing the astern clutch serves to impose a magnetic load on the counter-rotating, oil-lubricated plates 76 and 80 and results in a frictional drag tending to brake the rotational inertia of the transmission-propeller system and the torque imparted to the propeller by the momentum of the vessel. After the ahead rotation of the propeller shaft has been stopped or reduced to a permissible level, the magnetic particle coupling is again energized to establish drive through the transmission in the astern direction; the transmission being brought up to a speed corresponding to the astern position of the control lever by the relatively soft torque limiting and shock absorbing coupling action of the magnetic particle coupling. A high speed reversal from astern to ahead would be accomplished in a similar manner. During the period that either of the two multiple disk clutches are acting to brake the rotation of the transmission-propeller sysem in the opposing direction, the heat generated will be dissipated by oil which will also serve to lubricate the plate and prevent clutch seizure.

A second method of operation during such a high speed reversing cycle is through the provision of suitable interlocks in the main propulsion control to maintain the magnetic particle coupling 18 in its lock-up condition of operation, deenergizing the engaged reversing clutch unit, and simultaneously or immediately thereafter energizing the other of the reversing clutch units as the engine approaches its idle speed. As before, the newly energized clutch will act as a brake dissipating the rotational inertia of the transmission-propeller system before establishing drive in the opposite direction at a speed corresponding to the newly established position of the control lever. The main propulsion control for effecting such a high speed reversal would be relatively simple. However, it should be noted that the braking action of the newly energized reversing clutch unit will act as a load on the idling engine. In certain applications, such a load might tend to droop the governor controlled engine into an unstable condition of operation. In such applications, it is necessary to provide means for automatically advancing the governor controlled idle speed while such high speed reversing is being effected. It should also be noted that such operation will also require the braking clutch unit to dissipate the energy imparted to the system by the idling engine during the brief reversing cycle. The heat generated, however, would not be excessive, and due to the lubrication and cooling of the plate by the oil flow would have no effect on the soft coupling action which would be effected due to the loading characteristics of the coupling 18.

Still a third and preferred method of effecting such a high speed reversing operation is to provide interlocking of the main propulsion controls to first reduce the engine to idle speed upon movement of the control lever rapidly from one sector to the other past its neutral position. As the engine approaches its idle speed, the magnetic particle coupling is deenergized and the previously deenergized reversing clutch unit is energized. Thus the two reversing clutch units are both energized and, being drivingly interconnected through the transmission gearing, act in series to retard the rotational inertia of the transmission-propeller system and the feedback torque imparted to the propeller by the momentum of the vessel. As or after the propeller shaft reaches zero speed, the previously energized reversing clutch unit is deenergized with the simultaneous energization of the magnetic particle coupling to connect the engine with the reversed transmission system. This is accomplished with the same soft coupling action as with the other illustrative methods of high speed reversing. As with the other illustrative methods of reversing, the engine governor is interlocked to prevent an increase in enginespeed until after the reversing drive has been effected whereupon the speed of the propeller shaft is increased to a speed corresponding to the position of the control lever, either by controlled slippage of the magnetic particle coupling or by increasing the engine speed above the lock-up speed.

Only with the second method of high speed reversing operation will one of the reversing friction clutches be energized while connected to the idling engine. Consequently, the reversing clutch units for such operation must necessarily be selected at a starting torque rating corresponding to the idle torque rating of the engine; unless provision were made to reduce the torque transmittal through the magnetic particle coupling during such a reversing cycle thus complicating the propulsion control. With the first and third illustrative methods of high speed reversing operation, the reversing clutch units may be selected at their static or locked-up running torque rating since the applied torque at the time of their energization will be limited to that of the rotational inertia of the transmission-propeller system. Consequently, since the static running torque for such clutches is approximately half the rated starting torque, these reversing units need be only about half the size which would otherwise be required if these units were utilized without the provision for disconnecting the prime mover by means of the magnetic particle coupling.

While the electromagnetically-actuated, oil-cooled multidisk reversing clutch 30 of the illustrative embodiment of Figure 1 is relatively compact and lends itself to the design of relatively simple propulsion control equipment for remote electrical control, it is contemplated that other suitable types of reversing clutches might be used without distracting from the utility of certain aspects of the invention, utilizing properly interlocked propulsion control equipment. Similarly the invention is not considered limited to the specific use of a magnetic particle coupling with regard to certain other aspects of the invention.

It will also be appreciated that the invention is not in any way limited to the particular type of power transmission gearing with regard to still other aspects of the invention; that certain of the inventive concepts involved are equally applicable to change speed gearing of various types as well as to other types of reversing gears.

Figures 3 and 4 show one form of the invention as applied to a conventional countershaft type reverse-and-reduction transmission gear. In this embodiment of the invention, the reversing clutch mechanism of the previously described embodiment is replaced by two separate electromagnetically actuated clutches of similar design and function which are mounted on opposite axial ends of a transmission input shaft 260. The astern clutch unit 230' is mounted on the shaft 260 intermediate the transmission gear mechanism 300 and the gear case 300' and a magnetic particle coupling 218, the field pole assembly 216 of which is drivingly connected to the crankshaft 210 of the engine 212. The ahead clutch unit 230 is mounted on the opposite end of the shaft 260 outboard of the gear mechanism 300. The outboard mounting of the clutch units 230 and 230' facilitates their assembly and disassembly for ease of inspection and maintenance. It will be noted that the several elements of the embodiment of Figures 3 and 4 have been designated by the same last two digits, the third digit having been changed by the addition of the number 200, as their structural or functional counterparts in the previous embodiment.

When energized the ahead clutch unit 230 serves to either brake or drivingly connect the shaft 260 to a pinion gear 304 which in turn drives a bull gear 308 secured to the output propeller shaft 310 in the ahead propulsive direction. The astern clutch unit when energized similarly serves to either brake or drivingly connect the shaft 260 with an astern pinion which meshes with a countershaft-mounted idler 302 thereby driving a second gear 302' mounted on the idler countershaft. The gear 302' meshes with and serves to drive the bull gear 310 in the astern propulsive direction.

It will be noted that the armature or field pole assembly 216 of the magnetic particle coupling 218 includes four field coil windings 219 mounted in pockets formed between the annular members 220, the magnetic pole members 221, 222 and 223, and the non-magnetic pole separators 224 and 225. A cylindrical inductor member 226 spacedly embraced by the assembly 216 provides annular magnetic air gaps with the several pole members and is mounted on the astern clutch end of the shaft 260 by web 227 and hub 227'. A diaphragm 244 and a magnetic particle seal indicated at 240 serve to retain the magnetic particle bonding material within the coupling.

Figure 4 shows the details of construction of the astern clutch unit 230' which is identical with, but reversible and interchangeable, part for part, with the ahead clutch 230. As shown, the astern reversing unit includes a driving input assembly 229' including an electromagnetic pole member 253' keyed to the hollow shaft 260 and drivingly mounting an annular clutch plate driving member 272. The member 272 is axially slotted at 272' to engage the driving lugs of the plates 276 which are adapted to frictionally and magnetically engage coacting plates 280 and a keeper 290 which are internally splined or keyed to the hub 288 of the astern pinion 296. Engagement of the clutch unit is dependent upon energization of the field coil winding 257 which is mounted in the axially opened groove or pocket 255. The cooling and lubricating oil for the clutch unit is supplied through radial passages 316 and 318 in the hollow shaft 260 and the astern pinion gear hub 288. After the supplied oil has passed radially outwardly of the clutch, it is returned directly to the sump of the gear casing 300'.

The embodiment of the invention shown in Figures 3 and 4, is adapted to be controlled in the same manner as the embodiment of Figures 1 and 2 through the interlocking of suitable propulsion control equipment to effect either normal or high speed reversing operation.

From the foregoing description of the two illustrative embodiments of the invention, it will be seen that full control of the propeller speed from zero to full power ahead or astern is provided with finer, more accurate, slow speed control than with conventional direct current electrical drives previously considered as the optimum in marine reversing transmissions. This control provides fast, linear response over the slip-controlled speed range from substantially zero-idle speed to lock-up with no slip. Clutch wear, heat dissipation, alignment problems, and magnetic particle sealing problems are substantially minimized.

It will be appreciated by those skilled in the art that this represents a substantial improvement permitting the use of a reversing clutch drive on almost any vessel, being substantially unlimited in torque, size or capacity. While the illustrative designs indicate a substantial savings in the overall length of such power plants, and consequently in the pay load carrying capacity of the vessel, additional reductions in overall length could be accomplished by making the magnetic particle coupling concentric with either one or both reversing clutch units with some sacrifice in accessibility. However, this is not an essential factor since these clutch units require no mechanical adjustments to compensate for wear, etc.

While the foregoing description and figures have been confined to two specific embodiments of the invention, it will be apparent that numerous modifications can be made without departing from the spirit and scope of the several aspects of the invention as defined in the following claims.

I claim:

1. A drive control system for a power transmitting mechanism including an input shaft and an output shaft, a first means for effecting a driving connection between said shafts, a second means for effecting a reverse driving connection between said shafts, a third means for connecting said input shaft to a prime mover, and control means for selectively controlling said first and second means to establish said driving connections between said shafts, said control means including interlocking means responsive to the rotation of said output shaft and operative to energize said third means to drivingly connect said input shaft to said prime mover only when said output shaft is substantially at zero speed and one of said driving connections is established through one of said first two means.

2. In a mechanism adapted to provide reverse driving connections between an input shaft and an output shaft, drive control means comprising, in combination, a first means for effecting a forward driving connection between said shafts, a second means for effecting a reverse driving connection between said shafts, a third means adapted to progressively connect said input shaft with said first and second means, and a remote control means including a controller for sequentially energizing one of said first and second means to establish one of said driving connections and to then progressively energize said third means to progressively connect said one of said first and second means to said input shaft, said remote control means including means responsive to the rotation of said output shaft and adapting said control means to deenergize said third means and to simultaneously energize said first and second means to brake said output shaft upon actuation of said controller to effect a reversing cycle of said mechanism and to deenergize said one means as said output shaft reaches zero speed during said reversing cycle and to subsequently progressively energize said third means thereby reversing the drive through said mechanism.

3. A marine transmission comprising, in combination, an input shaft and an output shaft, a first means for effecting a driving connected between said shafts, a second means for effecting a reverse driving connection between said shafts, a third means for effecting a controllable slip driving connection between said input shaft and a prime mover, and control means for selectively controlling said first and second means to establish said driving connections between said shafts and adapted to progressively energize said third means to establish said driving connection between said input shaft and said prime mover with progressively decreasing slip therebetween up to a locked-up driving connection therebetween upon establishment of one of said driving connections between said shafts through actuation of one of said first and second means, said control means including means responsive to the rotation of said output shaft and operable to cause said control means to initially deenergize said third means thereby disconnecting said input shaft from said prime mover when said control means is actuated to effect a reversal in the driving connection between said shafts, to energize both of said first and second means to brake said output shaft to substantially zero speed, to subsequently and sequentially deenergize said one of said first and second means, the other of said first and second means remaining energized to establish the reverse driving connection between said shafts, and to then progressively energize said third means to reestablish said driving connection between said input shaft and said prime mover with progressively decreasing slip up to said locked-up driving connection.

4. In a marine transmission, the combination comprising an input shaft and an output shaft, a magnetic particle coupling means operable to effect a driving connection between said input shaft and a prime mover, means including reverse friction clutch mechanism for effecting reverse driving connections between said shafts, and control means for actuating said reverse clutch mechanism to selectively establish said driving connections between said shafts and adapted to progressively energize said magnetic particle coupling means to establish said driving connection between said input shaft and said prime mover with progressively decreasing slip therebetween up to a locked-up driving connection therebetween upon establishment of one of said driving connections between said shafts through the selective actuation of said reverse clutch mechanism, said control means including means responsive to the rotation of said output shaft and operable to cause said control means to initially deenergize said magnetic particle coupling means when said control means is actuated to effect a reversal in the driving connection between said shafts through said reverse clutch mechanism, to then actuate said reverse clutch mechanism to brake said output shaft to substantially zero speed, to subsequently actuate said reverse mechanism to establish the reverse driving connection between said shafts, and to then progressively energize said magnetic particle coupling means to reestablish said driving connection between said input shaft and said prime mover with progressively decreasing slip up to said locked-up driving connection.

5. A power transmission comprising, in combination, a prime mover driven input shaft, an output shaft, a first means including a first electromagnetically controlled clutch means for effecting a driving connection between said shafts, a second means including a second electromagnetically controlled clutch means for effecting a reverse driving connection between said shafts, a third means including a third electromagnetically controlled clutch means intermediate said input shaft and said first and second means for progressively connecting and disconnecting portions of said first and second means to control the establishment of a driving connection between said shafts, and electrical control means including a control lever operative to selectively energize said clutch means to control the drive between said shafts, said electrical control means including interlocking means responsive to the rotation of said output shaft and operative to cause said control means to initially deenergize said third clutch means when said control lever is actuated to effect a reversal in the driving connection between said shafts as established by said first and second clutch means.

6. The combination as set forth in claim 5 and in which said control means is adapted to simultaneously energize said first and second clutch means thereby tending to drivingly interconnect said first and second clutch means through said output shaft when said first and second means are disconnected from said input shaft.

7. The combination as set forth in claim 5 and in which said control means is conditioned by said interlocking means to permit energization of the one of said first and second means for effecting the reverse driving connection between said shafts after said first and second means have been disconnected from said input shaft.

8. In a power transmission, the combination comprising a driving shaft and a driven shaft, a first drive control means associated with one of said shafts and operative to effect a reversal in the drive of said driven shaft, a second drive control means intermediate said first drive control means and the other of said shafts, and means for selectively controlling the actuation of said drive control means and including interlocking means responsive to the relative rotation of said shafts and operable to deenergize said second drive control means when said first drive control means is being actuated by said controlling means to effect a reversal in the drive direction of said driven shaft.

9. In a transmission, the combination comprising a driving shaft and a driven shaft, means including a reverse clutch mechanism associated with one of said shafts for effecting a reversal in the drive of said driven shaft, a magnetic particle coupling intermediate said reverse clutch mechanism and the other of said shafts, and control means for selectively controlling the actuation of said clutch mechanism and said coupling and including interlocking means responsive to the rotation of said driven shaft and operable on said control means to program the operation of said clutch mechanism and said coupling when said control means is actuated to effect a reversal in the drive of said driven shaft.

10. A power plant comprising, in combination, a prime mover adapted to rotatably drive a shaft in one direction within a limited speed range; means for regulating the operation of said prime mover within said speed range; a power transmission adapted to drivingly connect said prime mover to a load mechanism and comprising a driving shaft and a driven shaft, a first and second drive establishing means intermediate said driving and driven shafts, said first and second means being selectively energizable to effect a reversal in the drive of said driven shaft and simultaneously energizable to effect a braking action on said driven shaft, a third drive establishing means intermediate said prime mover shaft and said transmission driving shaft and selectively energizable to effect a driving connection therebetween; means for controlling the energization of said first and second and third drive establishing means; and control means associated with said regulating means and said drive controlling means and including interlocking means responsive to the rotation of said driven shaft for programming the operation of said regulating means and said drive establishing means, said programming means being adapted upon actuation of said control means to effect a reversal in the drive of said driven shaft to first actuate said prime mover regulating means to reduce the speed of said prime mover toward the minimum speed of said range, to then deenergize said third drive means thereby disconnecting said transmission driving shaft from said prime mover shaft and to simultaneously energize said first and second drive means to brake said driven shaft, to then selectively deenergize one of said first and second drive means when the speed of said driven shaft approaches zero to effect the reversal in the drive of said driven shaft, to subsequently energize said third drive means to reestablish the driving connection between said prime mover shaft and said driving shaft, and to subsequently actuate said prime mover speed regulating means to increase the speed of said prime mover in accordance with the actuation of said control means.

11. In a power plant, the combination comprising a prime mover adapted to rotatably drive a shaft in one direction, means for controlling the operation of said prime mover to rotatably drive said shaft within a limited speed range, a transmission mechanism adapted to drivingly connect said prime mover to a load mechanism, transmission mechanism including a driving shaft and a driven shaft, means for effecting reverse driving connections intermediate said driving and driven shafts and including two friction clutch mechanisms intermediate said driving and driven shafts, said friction clutch mechanisms being selectively energizable to effect a reversal in the drive of said driven shaft and simultaneously energizable to effect a braking action on said driven shaft, a magnetic particle clutch mechanism intermediate said prime mover shaft and said transmission driving shaft, and electrical control means for selectively controlling the energization of said prime mover controlling means and of said clutch mechanisms, said electrical control means including interlocking means responsive to the rotation of said driven shaft for programming the actuation of said prime mover controlling means and of said clutch mechanisms when said electrical control means is actuated to effect a reversal in the drive of said driven shaft as effected by one of said friction clutch mechanisms, said interlocking means being adapted to first actuate said prime mover controlling means to reduce the speed of said prime mover shaft toward the minimum speed of said range, to deenergize said magnetic particle clutch mechanism when the speed of said driven shaft corresponds to the minimum speed of said prime mover thereby disconnecting said transmission driving shaft from said prime mover shaft, to then simultaneously energize said friction clutch mechanisms to brake said driven shaft, to selectively energize the other of said friction clutch mechanisms when the speed of said driven shaft approaches zero to effect a reversal in the drive of said driven shaft, to subsequently progressively energize said magnetic particle clutch mechanism to reestablish the driving connection between said prime mover shaft and said driving shaft, and to subsequently actuate said prime mover controlling means to increase the speed of said prime mover in accordance with the actuation of said electrical control means.

12. A transmission mechanism adapted to drivingly interconnect a unidirectional prime mover to a reversible load, said transmission mechanism comprising, in combination, a driving shaft and a driven shaft, means for effecting reverse driving connections between said driving and driven shafts and including two friction clutch mechanisms intermediate said driving and driven shafts, said friction clutch mechanisms being independently operable to effect a reversal in the drive of said driven shaft and simultaneously operable to effect a braking action on said driven shaft, a magnetic particle clutch mechanism intermediate said prime mover and said transmission driving shaft, electrical control means for controlling the actuation of said clutch mechanisms and thereby the driving relationship between said shafts, said electrical control means including interlocking means responsive to the rotation of said driven shaft for programming the operation of said clutch mechanisms when said electrical control means is actuated to effect a reversal in the drive of said driven shaft as effected by one of said friction clutch mechanisms, said interlocking means being sequentially adapted to deenergize said magnetic particle clutch mechanism thereby disconnecting said transmission driving shaft from said prime mover, to actuate the other of said friction clutch mechanisms thereby causing said friction clutch mechanisms to frictionally brake said driven shaft, to deenergize said one friction clutch mechanism when the speed of said driven shaft approaches zero thereby permitting said other friction clutch mechanism to effect a reversal in the drive of said driven shaft, and to subsequently energize said magnetic particle clutch mechanism to reestablish the driving connection between said prime mover and said driving shaft in accordance with the actuation of said drive control means.

13. In a transmission mechanism adapted to provide reverse driving connections between an input shaft and an output shaft, a drive control mechanism comprising, in combination, a first clutch mechanism for effecting a forward driving connection between said shafts, a second clutch mechanism for effecting a reverse driving connection between said shafts, a third clutch mechanism for connecting said input shaft with said first and second clutch mechanism, said clutch mechanisms having controllable slip characteristics, a remote control means including a controller movable in opposite directions from an intermediate neutral position and operable to selectively energize said first and second clutch mechanisms to establish one of said driving connections and to then progressively energize said third clutch mechanism to progressively connect said one of said first and second clutch mechanisms to said input shaft in accordance with the position of said controller, and means for interlocking the operation of said control means in accordance with the rotation of said output shaft upon movement of said controller past said intermediate neutral position to effect a reversing cycle of said transmission mechanism, said interlocking means being sequentially operable through said control means to deenergize said third clutch mechanism and to simultaneously energize said first and second clutch mechanism to controllably brake the rotation of said output shaft, said output shaft responsive means being controllably adapted to deenergize said one clutch mechanism as said output shaft approaches a predetermined minimum speed during said reversing cycle and to subsequently energize said third coupling means in accordance with the actuation of said controller thereby reversing the drive between said shafts.

14. In a mechanism adapted to provide reverse driving connections between an input shaft and an output shaft, drive control means comprising, in combination, a first means for effecting a forward driving connection between said shafts, a second means for effecting a reverse driving connection between said shafts, a third means adapted to connect said input shaft with said first and second means, and a remote control means including a controller for sequentially energizing one of said first and second means to establish one of said driving connections and to then energize said third means to connect said one of said first and second means to said input shaft, said remote control means including means responsive to the rotation of said output shaft and adapting said control means to deenergize said third means and to simultaneously energize said first and second means to brake said output shaft upon actuation of said controller to effect a reversing cycle of said mechanism and to deenergize said one means as said output shaft reaches zero speed during said reversing cycle and to subsequently energize said third means thereby reversing the drive through said mechanism.

15. In a marine transmission, the combination comprising an input shaft and an output shaft, a magnetic particle coupling means operable to effect a driving connection between said input shaft and a prime mover, means including a reverse friction clutch mechanism for effecting reverse driving connections between said shafts, and control means for actuating said reverse clutch mechanism to selectively establish said driving connections between said shafts and adapted to energize said magnetic particle coupling means to establish said driving connection between said input shaft and said prime mover upon establishment of one of said driving connections between said shafts through the selective actuation of said reverse clutch mechanism, said control means including means responsive to the rotation of said output shaft and operable to cause said control means to initially deenergize said magnetic particle coupling means when said control means is actuated to effect a reversal in the driving connection between said shafts through said reverse clutch mechanism, to then actuate said reverse clutch mechanism to brake said output shaft to substantially zero speed, to subsequently actuate said reverse mechanism to establish the reverse driving connection between said shafts, and to then energize said magnetic particle coupling means to reestablish said driving connection between said input shaft and said prime mover.

16. A power transmission comprising, in combination, a prime mover driven input shaft, an output shaft, a first means including a first electromagnetically controlled clutch means operable to effect a driving connection between said shafts, a second means including a second electromagnetically controlled clutch means operable to effect a reverse driving connection between said shafts, a third means including a third electromagnetically controlled clutch means intermediate said input shaft and said first and second means for connecting and disconnecting portions of said first and second means to control the establishment of a driving connection between said shafts, and electrical control means including a control lever operative to selectively energize said clutch means to control the drive between said shafts, said electrical control means including interlocking means responsive to the rotation of said output shaft and operative to cause said control means to initially deenergize said third clutch means when said control lever is actuated to effect a reversal in the driving connection between said shafts as established by said first and second clutch means.

17. A transmission mechanism adapted to drivingly interconnect a unidirectional prime mover to a reversible load, said transmission mechanism comprising, in combination, a driving shaft and a driven shaft, means for effecting reverse driving connections between said driving and driven shafts and including two clutch mechanisms intermediate said driving and driven shafts, said clutch mechanisms being independently operable to effect a reversal in the drive of said driven shaft and simultaneously operable to effect a braking action on said driven shaft, a third clutch mechanism intermediate said prime mover and said transmission driving shaft and operable to establish a driving connection therebetween, electrical control means for controlling the actuation of said clutch mechanisms and thereby the driving relationship between said shafts, said electrical control means including interlocking means responsive to the rotation of said driven shaft for programming the operation of said clutch mechanisms when said electrical control means is actuated to effect a reversal in the drive of said driven shaft as effected by one of said first two clutch mechanisms, said interlocking means being sequentially adapted to deenergize said third clutch mechanism thereby disconnecting said transmission driving shaft from said prime mover, to actuate the other of said first two clutch mechanisms thereby causing said two clutch mechanisms to frictionally brake said driven shaft, to deenergize said one clutch mechanism when the speed of said driven shaft approaches zero thereby permitting said other clutch mechanism to effect a reversal in the drive of said driven shaft, and to subsequently energize said third clutch mechanism to reestablish the driving connection between said prime mover and said driving shaft in accordance with the actuation of said drive control means.

18. In a transmission mechanism adapted to provide reverse driving connections between an input shaft and an output shaft, a drive control mechanism comprising, in combination, a first clutch mechanism for effecting a forward driving connection between said shafts, a second clutch mechanism for effecting a reverse driving connection between said shafts, a third clutch mechanism for connecting said input shaft with said first and second clutch mechanism, control means including a controller movable in opposite directions from an intermediate neutral position and operable to selectively energize said first and second clutch mechanisms to establish one of said driving connections and to then energize said third clutch mechanism to connect said one of said first and second clutch mechanisms to said input shaft in accordance with the position of said controller, and means for interlocking the operation of said control means in accordance with the rotation of said output shaft upon movement of said controller past said intermediate neutral position to effect a reversing cycle of said transmission mechanism, said interlocking means being sequentially operable through said control means to deenergize said third clutch mechanism and to simultaneously energize said first and second clutch mechanism to controllably brake the rotation of said output shaft, to deenergize said one clutch mechanism as said output shaft approaches a predetermined minimum speed during said reversing cycle and to subsequently energize said third coupling means in accordance with the actuation of said controller thereby reversing the drive between said shafts.

References Cited in the file of this patent

FOREIGN PATENTS

7539     Great Britain _____ 1891